United States Patent [19]

Takada

[11] Patent Number: 4,494,709

[45] Date of Patent: Jan. 22, 1985

[54] SEAT BELT RETRACTOR WITH AN AUTOMATICALLY MEMORIZED TENSIONLESS POSITION

[76] Inventor: Juichiro Takada, 3-12-1, Shinmachi, Setagayaku, Tokyo, Japan

[21] Appl. No.: 526,901

[22] Filed: Aug. 26, 1983

[30] Foreign Application Priority Data

Sep. 1, 1982 [JP] Japan .................. 57-150792

[51] Int. Cl.$^3$ ................. A62B 35/00; B65H 75/48
[52] U.S. Cl. ..................... 242/107.6; 280/807
[58] Field of Search ............ 242/107.6, 107.7, 107.12; 280/806–808, 803; 297/475–480

[56] References Cited

U.S. PATENT DOCUMENTS

| | | | |
|---|---|---|---|
| 4,199,172 | 4/1980 | Fukunaga et al. | 242/107.6 X |
| 4,228,971 | 10/1980 | Arima et al. | 242/107.6 |
| 4,261,531 | 4/1981 | Naitoh | 242/107.6 |
| 4,387,862 | 6/1983 | Sakurada et al. | 242/107.6 |
| 4,456,196 | 6/1984 | Takada et al. | 242/107.6 |

*Primary Examiner*—John M. Jillions
*Attorney, Agent, or Firm*—Brumbaugh, Graves, Donohue & Raymond

[57] ABSTRACT

A seat belt retractor includes a mechanism for keeping the belt reel from rotating in the winding direction at the urging of the winding spring when the reel is at an automatically memorized rotational position. The mechanism comprises an internal toothed gear wheel affixed to the reel shaft and which carries a hook adjacent the perimeter that is biased toward the reel shaft. A clutch ring is frictionally coupled to the gear wheel by a clutch spring and has an abutment. A gear carrier is rotatably received by the gear wheel and has external teeth. An idler gear rotatably carried by the gear carrier meshes with the internal gear teeth on the gear wheel. A protrusion on the idler gear engages the hook when the idler gear is in a memorized position relative to the hook, which position is dependent upon the relative rotational positions of the gear wheel and gear carrier. In the memorized position, the hook is held outwardly for engagement with an abutment on the gear carrier and stops rotation of the gear wheel, relative to the gear carrier, in the belt-winding direction. A memory spring connected between the gear carrier and the reel shaft urges the gear carrier in rotation in the belt-winding direction. A lever pivotably carried by the frame has a toothed portion that is releasably and selectively engageable with the teeth on the gear carrier by an actuating means that selectively urges the lever in a direction to engage the aforementioned teeth.

1 Claim, 7 Drawing Figures

SEAT BELT RETRACTOR WITH AN AUTOMATICALLY MEMORIZED TENSIONLESS POSITION

FIELD OF THE INVENTION

The present invention relates to a seat belt retractor of the type having a mechanism for preventing the reel from being rotated in the belt-winding direction when the belt is fitted to the vehicle occupant, thus keeping the belt tensionless and, therefore, more comfortable for the user.

BACKGROUND OF THE INVENTION

Most motor vehicles being manufactured currently are equipped with safety belts that wind onto and unwind from retractors, which are usually of the emergency locking type. Although many such retractors in present use maintain a constant tension on the belt due to the retractor winding spring, there are also retractors that lock in an adjusted position and are slack and hence more comfortable to the wearer. Many of those tensionless types of retractors are of complicated construction, large in size, high in weight and costly to make. Some of them have a noisy clutch and gear system. Others do not reset to proper fit after the user leans forward without manipulation by the user. Still others do not allow the belt to pull out after tensionless adjustment. Finally, many tensionless types use a fairly large solenoidal actuator that draws a lot of electrical current, which is a strain on the vehicle battery and reduces its life.

SUMMARY OF THE INVENTION

An object of the present invention is to reduce the size, weight, complexity and cost of a tensionless emergency locking retractor. Another object is to provide a quiet locking mechanism. Yet another object is to provide a "memory" in the mechanism that is easy to set and that allows the user to lean forward without unsetting the memorized tensionless position.

The foregoing and other objects are fulfilled, according to the present invention, by a seat belt retractor having a novel and advantageous mechanism for keeping the belt reel from rotating in the belt-winding direction at the urging of the winding spring when the reel is at an automatically memorized rotational position. This mechanism is characterized by a unique combination of elements comprising a gear wheel affixed to the belt reel shaft for rotation therewith and having internal teeth within a recess, a hook rotatably carried by the gear wheel adjacent the perimeter thereof and biased toward the reel shaft by a spring, a clutch ring frictionally coupled to the gear wheel by a clutch spring for rotation with the rear wheel and having an abutment, a gear carrier received by the gear wheel for rotation relative thereto about the axis of the reel shaft and having external teeth, an idler gear rotatably carried by the gear carrier and meshing with the internal gear teeth on the gear wheel and having a protrusion engageable with the hook when the idler is in a memorized position relative to the hook, which in turn depends upon the relative rotational positions of the gear wheel and gear carrier, the hook being engageable with an abutment on the gear carrier to stop rotation of the gear wheel, relative to the gear carrier, in the belt-winding direction upon engagement of the idler gear protrusion with the hook, a memory spring connected between the gear carrier and the shaft to urge the gear carrier in rotation in the belt winding direction about the reel shaft axis, a lever pivotably carried by the frame and having a toothed part engageable with the teeth on the gear carrier, actuating means for selectively urging the lever to pivot in a direction to engage the toothed part with the gear carrier teeth, and a friction plate pivotably mounted on a pin on the lever and selectively engaging the reel shaft and holding the lever toothed part out of engagement with the gear carrier teeth until a small rotation of the reel in the unwinding direction disengages the plate from the reel.

The invention will be more completely understood from a study of the following description of an exemplary embodiment, undertaken in conjunction with the accompanying drawings.

DESCRIPTION OF THE EMBODIMENT

Figure 1:
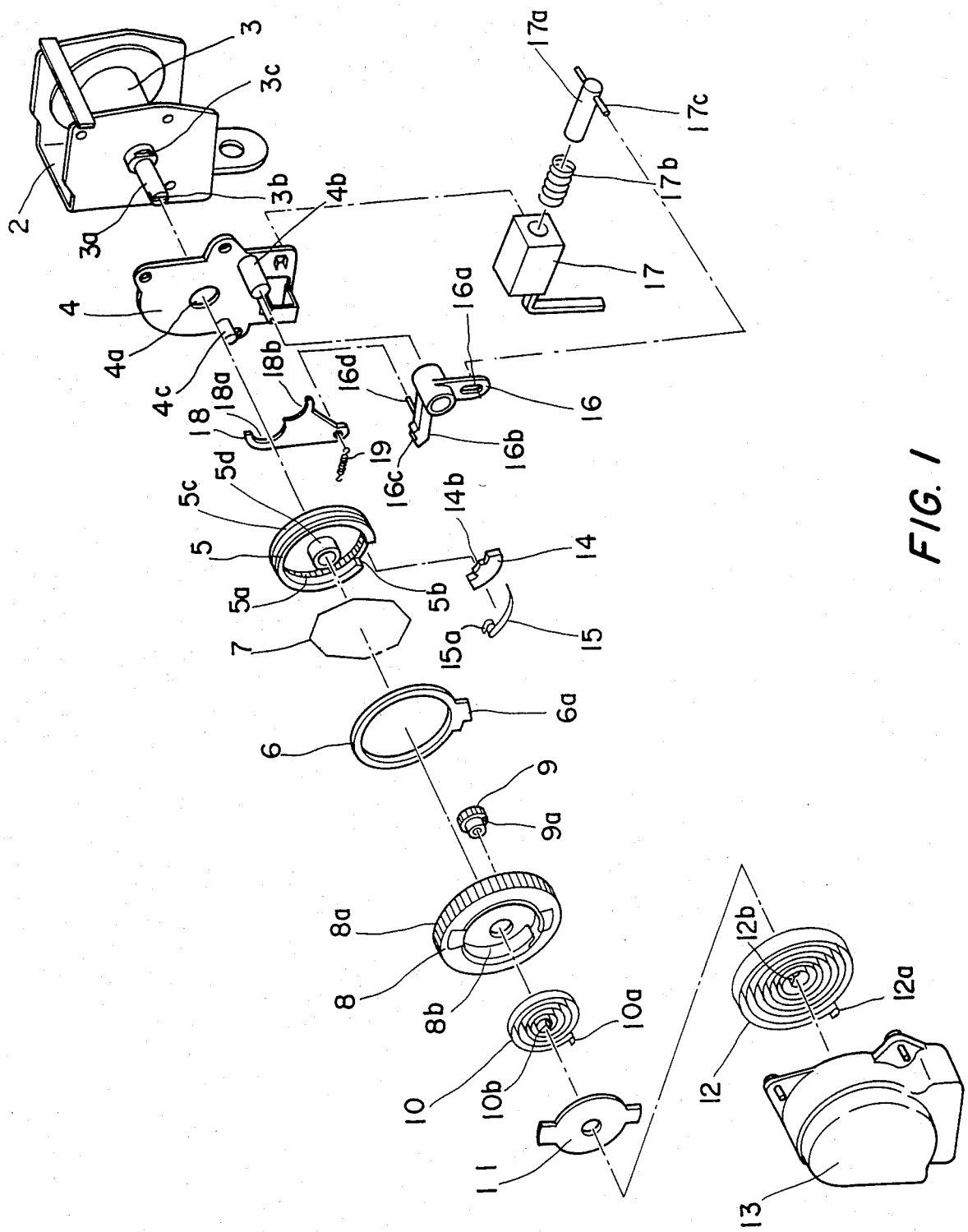
FIG. 1 is an exploded perspective view of the embodiment.
Figure 2:
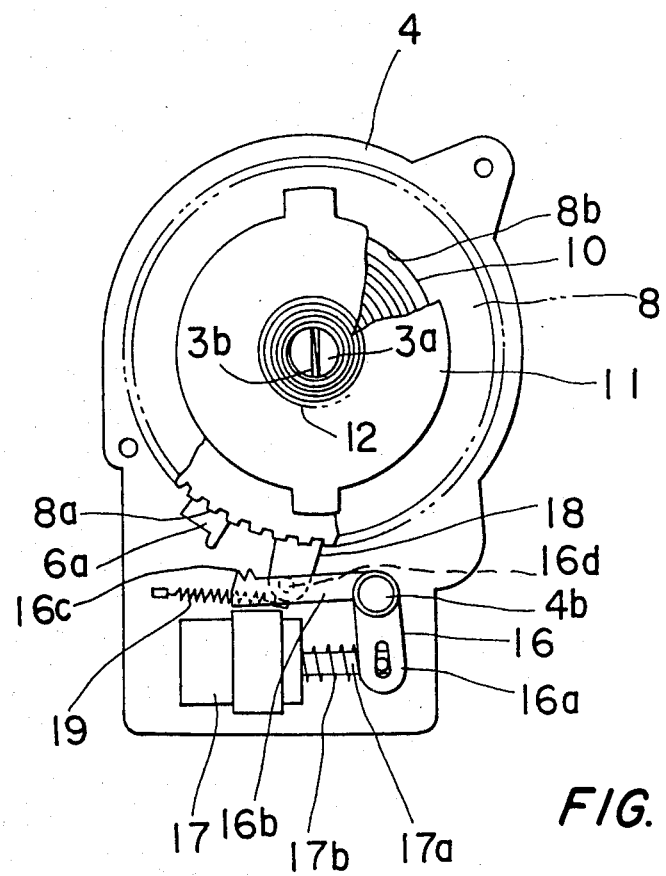
FIG. 2 is a partly broken away side elevational view of the embodiment in an assembled condition.

In the drawings, the reference numeral 1 designates generally a seat belt retractor, according to the invention. It includes a frame 2 of U-shaped cross section carrying a rotatable shaft 3 (also referred to as the reel shaft) having one end of a belt 20 attached thereto. One end 3a of the shaft extends out from the frame and has a groove 3b formed crosswise along the outer end. The other end of the shaft is coupled to an emergency locking mechanism (not shown) of any suitable design, many of which are well known in the art.

The frame 2 has a bracket 4 attached thereto by a suitable means, such as a screw, on one side thereof, the end 3a of the shaft 3 extending through a hole 4a in the bracket. The bracket 4 is provided with a supporting shaft 4b pivoting a lever 16 (which is described below) and a pin 4c that is engageable by a projecting lug 6a of a clutch plate 6, the shaft and pin both projecting out from the bracket 4.

Figure 3:
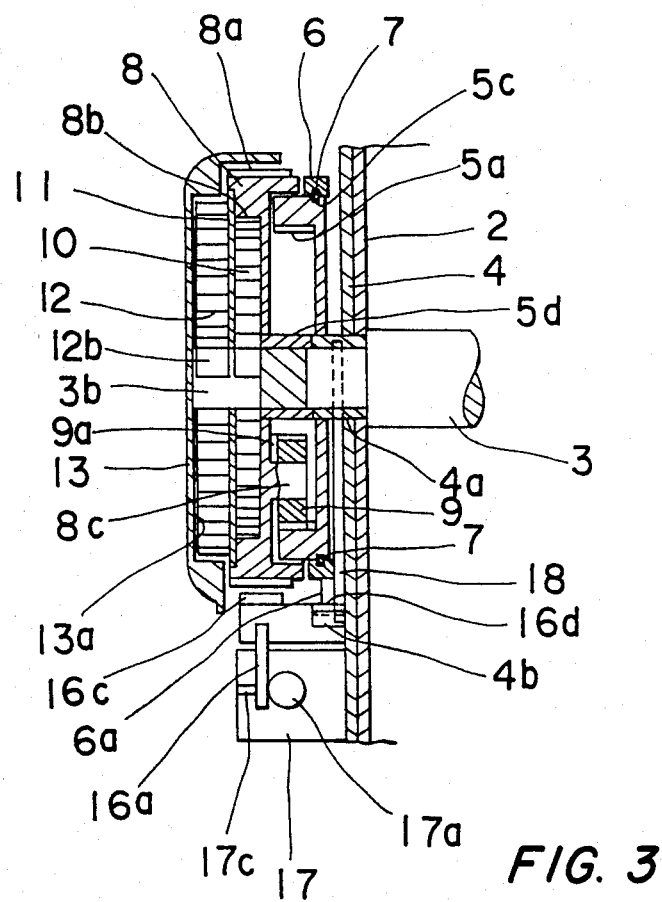
FIG. 3 is a longitudinal cross-sectional front view of the embodiment.

A large diameter part 3c of the projecting part 3a of the shaft 3 receives a gear wheel 5, which is fixed to the shaft for rotation therewith. The gear wheel 5 includes internal teeth 5a, a notch 5b housing a hook 14 (described below) and a groove 5c, which is on the outer periphery thereof and which receives a clutch spring 7 (also described below). A clutch plate 6 is received outwardly of the clutch spring, also on the outer periphery of the gear wheel (see FIG. 3). The clutch plate 6 has a lug 6a that is engageable with a pin 16d on the lever 16. The clutch spring 7 couples the clutch plate to the gear wheel for rotation together except when the lug 16a strikes one or the other of the pins 4c or 16d, in which case the clutch plate 16 stops while the gear wheel can continue to rotate with the reel shaft 3.

Figure 5:
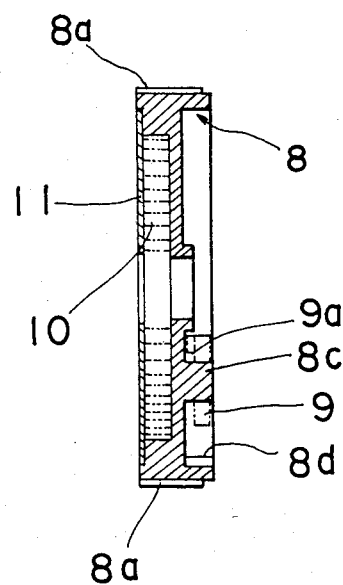
FIG. 5 is a longitudinal cross-sectional front view of the gear carrier and some of the adjacent components.

A gear carrier 8 is rotatably received by a shaft portion 5d of the gear wheel 5 and has teeth 8a on the outer periphery thereof and a circular recess 8b housing a memory spring 10 (described below) on one side thereof (see FIG. 5). The gear carrier 8 is also provided with a shaft 8c that supports an idler gear 9 and a protrusion 8d that is releasably and selectively engageable with the hook 14 on the gear wheel 5. The gear carrier 8 is constructed to cover the gear wheel 5 with the inside of the outer periphery of the gear carrier 8 fitting over the outside of the gear wheel. The memory spring 10 is housed in the recess 8b of the gear carrier with its outer end 10a attached to the gear carrier 8 and the inner end 10b engaged in the groove 3b of the shaft 3. The memory spring 10 is retained in the recess of the carrier 8 by a spring cap 11, which also serves as a partition between a main winding spring 12 of the retractor and the memory spring 10. The winding spring 12 is housed in a portion 13a of a cover 13 that is affixed to the frame 2 (e.g., by screws). The outer end 12a of the spring is fastened to the cover 13, and the inner end 12b is engaged in the groove 3b of the shaft 3.

Figure 4:
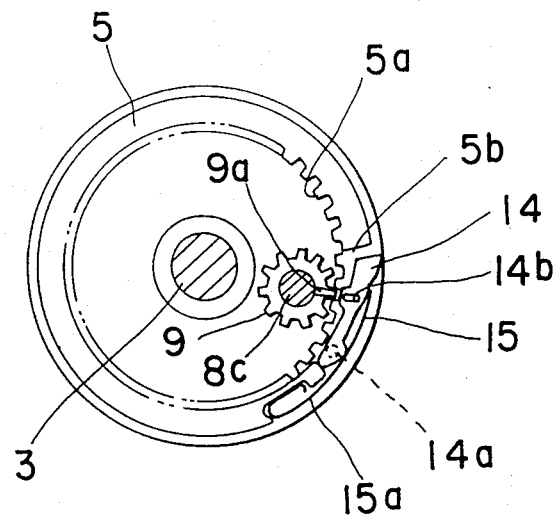
FIG. 4 is a fragmentary side cross-sectional view of the gear wheel and some of the elements associated with it.

The hook 14 is rotatably received in the notch 5b of the geared wheel 5 on a supporting shaft 14a (see FIG. 4) and is biased in a direction toward the reel shaft 3 by a hook spring 15, one end 15a of which is attached to a recess adjacent the notch 5b of the gear wheel 5. The hook 14 has a protrusion 14b which faces in toward shaft 3 and is engageable by a protrusion 9a on the idler gear 9. The movement of the hook 14 inwardly toward the shaft 3 is limited so that the inwardly facing end of the protrusion 14b may not project inwardly beyond the tips of the internal teeth 5a of the gear wheel 5 (i.e., the inwardmost position which the inner end of the protrusion 14b can attain is contiguous to the tips of the internal teeth 5a) so that the gear wheel 5 can rotate relative to the gear carrier 8 with the idler gear 9 idling abouts its shaft 8c. When the tip end of the hook 14 is pushed out of the outer periphery of the gear wheel 5 by the engagement between the protrusion 14b of the hook 14 and the protrusion 9a of the idler gear 9, the protrusion 8d of the gear carrier 8 is engaged by the tip end of the hook 14, thereby to prevent rotation of the gear wheel 5 relative to the gear carrier 8 in the belt-winding direction. It will be clear from the description below of the operation of the embodiment that it is this engagement of the tip of the hook 14 with the protrusion 8d on the gear carrier 8, which itself becomes nonrotatable when the belt is done up on the vehicle occupant, that keeps the belt tensionless—it will be recalled in this connection that the gear wheel is fixed to the reel shaft.

The lever 16 is pivoted on the shaft 4b of the bracket 4 and has an arm 16a that is coupled to the plunger 17a of the solenoid 17 by a pin 17c and a second arm 16b that has teeth 16c that are engageable with the outer teeth 8a of the gear carrier 8. The arm 16b has a pin 16d which engages the lug 6a of the clutch plate 6. When the solenoid 17 is energized, the lever 16 rotates in a direction such that the teeth 16c engage the teeth 8a of the gear carrier 8. When the solenoid is de-energized, the teeth 16c disengage by the restoring action of a return spring 17b.

A friction plate 18 is journalled by a pin 16d on the lever 16, the friction plate 18 being positioned such that its tip end enters between the bracket 4 and the gear wheel 5. It is biased by a friction plate spring 19 having one end attached to the bracket 4 so that it is urged toward the side of the reel shaft 3.

The solenoid 17 is connected to a power source in series through a switch (not shown) provided in the seat belt buckle 20 (FIG. 6) so that it is energized upon coupling of the buckle when the belt is done up. A seat belt retractor according to the present invention may also employ a switch that cooperates with a seat slide lever for adjusting the fore and back position of the seat and/or a switch that cooperates with the reclining device for adjusting the slant of the seat back, such switch(es) being in series between the power source and the solenoid 17 and being closed except when the associated lever is operated to enable adjustment of the seat.

Figure 6:
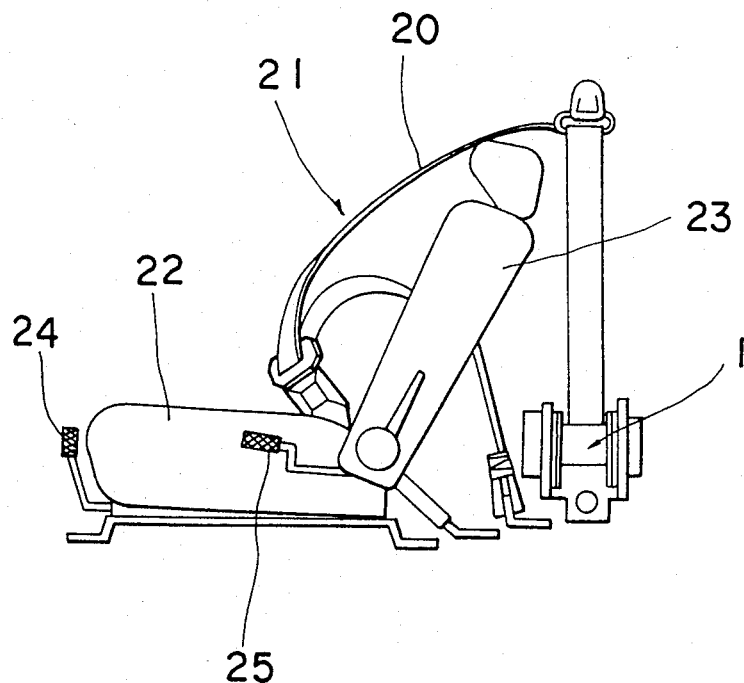
FIG. 6 is a side elevational view of a seat belt system typical of those with which the invention can be used.

In a typical belt system having a retractor according to the present invention, as shown in FIG. 6, the seat 21 comprises a seat portion 22 and a seat back 23. The fore and back position of the entire seat can be adjusted by a slide lever 24, and the slant of the seat back can be adjusted by a reclining lever 25. These levers 24 and 25 have switches so that when either of the levers 24 and 25 is operated to adjust the seat, the associated switch is opened and the solenoid is de-energized until the lever is released, whereupon the switch closes.

The function of the embodiment is described in the following sections.

(a) Winding of the belt onto the retractor:

When the belt is done up, the retractor is set to maintain a memorized, tensionless position in which the solenoid is energized, the gear carrier 8 is held stationary by the lever 16 and the gear wheel 5 is stopped from rotating in the belt-winding direction by engagement of the hook 14 with the protrusion 8d of the gear carrier. The friction plate 18 is positioned with the notched portion 18b in engagement with the reel shaft 3, which holds the spring 19 under tension.

When the occupant undoes the buckle, the solenoid 17 is de-energized, so the plunger 17a becomes subject to the biasing force of the return spring 17b, which pivots the lever 16 to disengage the lever teeth 16a from the teeth 8a of the gear carrier 8. At this time the end portion 18a of the friction plate 18 is engaged against the side and under surfaces of the reel shaft 3 at the urging of the friction plate spring 19. The gear carrier 8 is under a small rotational force tending to rotate it in the belt-unwinding direction (clockwise in the drawings) imposed by the memory spring 10. The protrusion 9a of the idler gear 9, however, engages the protrusion 14b of the hook 14 to hold the hook 14 out from the outer periphery of the gear wheel 5, and the tip of the hook 14 engages the protrusion 8d of the gear carrier 8 such as to impede rotation of the gear carrier 8 in a belt-unwinding direction, so the gear carrier 8 does not respond to the biasing force of the memory spring 10 to rotate in a belt-unwinding direction.

The main winding spring 12 is connected directly between the cover 13 (and hence the frame 2) and the reel shaft. There is nothing to stop the rotation of the mechanism in the belt-winding direction (counterclockwise in the drawings), so the belt is wound onto the reel. The gear wheel 5 rotates with the reel shaft (to which it is affixed) and the memory spring 10 makes the gear carrier 8 co-rotate with the reel shaft, because it does not want to tighten and sustain a greater force. Therefore, the "memory positions" of the gear wheel 5, gear carrier 8, hook 14 and idler gear 9 are retained as the belt is wound onto the retractor.

(b) Unwinding of the belt:

When the belt 20 is withdrawn from the retractor, the gear wheel 5 (fixedly attached to the reel shaft 3) co-rotates clockwise with the reel shaft 3. The memory spring 10 biases the gear carrier 8 concurrently to rotate with the gear wheel 5 and reel shaft 3. Upon this rotation, only the clutch plate 6 is stopped from rotating by the engagement between its protrusion 6a and the pin 16d of the lever 16. Then, when the buckle is done up, the switch (not shown) in the buckle is closed to energize the solenoid 17 and thereby tend to pull the pole piece 17a in against the biasing force of the return spring 17b so as to rotate the lever 16 in a direction (clockwise) such that the teeth 16c of the lever 16 engage the teeth 8a of the gear carrier 8. However, because the protrusion 6a of the clutch plate 6 and the pin 16d of the lever 16 are engaged, the lever 16 cannot rotate and is retained in a biased condition but cannot yet rotate in a direction to engage the teeth 16c of the lever 16 with the teeth 8a of the gear carrier holder 8.

When the vehicle occupant allows the slack in the belt to be taken up by the retractor until the belt is fitted to him, the gear carrier 8, the clutch plate 6 and the gear wheel 5 rotate counterclockwise due to rotation of the reel shaft 3 in a belt-winding direction. Upon a partial revolution of the mechanism, the protrusion 6a of the clutch plate 6 is disengaged from the pin 16d of the lever 16, because the clutch plate 6 is stopped from rotating by engaging a protrusion (not shown) provided on the cover 13. However, because the tip portion 18a of the friction plate 18 still engages the under surface of the reel shaft 3, the teeth 16c of the lever 16 and the teeth 8a of the gear carrier 8 remain held out of engagement, and the gear carrier can still rotate with the gear wheel and reel shaft.

Figure 7:
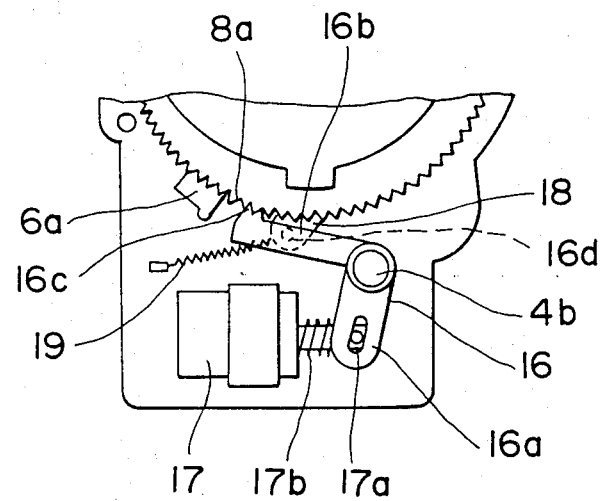
FIG. 7 is a partial side elevational view illustrating the teeth of the gear carrier and the teeth of the actuating lever in engagement.

(c) Setting the memory position of the retractor:

To set the tensionless memory position, the vehicle occupant need only pull the belt slightly out—otherwise the belt will stay under tension until he leans forward slightly, which will also set the memory position. When the belt is slightly unwound from the retractor from the condition described above in section (b), the friction plate 18 is pushed out of engagement from the side face of the reel shaft 3 (the pin 16d of the lever 16 is a fulcrum and moves down slightly from the undersurface of the shaft 3) by the co-action of the clockwise rotation of the reel shaft and the friction between the shaft and the friction plate 18. This did not happen when the belt was first pulled out and the buckle fastened because the engagement of the protrusion 6a on the clutch plate 6 with the lever pin 16d kept the lever arm 16b from applying an upward force due to the return spring 17b (which was biased but could not act) on the friction plate 18, and, hence, the friction plate stayed engaged up to this point. Now that the friction plate is disengaged, the lever 16 can and does rotate clockwise to engage the teeth 16c with the teeth 8a of the gear carrier 8 (see FIG. 7), thereby to stop the rotation of the gear carrier 8. The reel shaft 3 is prevented from rotating in the belt-winding direction, and the belt tension becomes zero, because the idler gear 9 keeps the hook 14 on the gear wheel 5 pushed out into engagement with the protrusion 8d on the gear carrier 8. Accordingly, the gear wheel 5 cannot rotate in the belt-winding direction (counterclockwise in the drawings).

(d) Memorization of the tensionless position:

The position where the rotation of the reel shaft 3 in the belt-winding direction just described above in part (c) is prevented is the memorized tensionless position.

When the belt 20 is pulled out by forward movement of the vehicle occupant, such as when he leans forward from the memorized position, the reel shaft 3 rotates clockwise. Rotation of the shaft winds up the return spring 12 and the memory spring 10. In particular, the gear carrier 8 cannot rotate because it is locked by the lever, but the gear wheel 5 is free to rotate with the reel shaft 3 (to which it is affixed) in the clockwise direction—the hook 14 only stops counterclockwise (belt-winding) rotation of the gear wheel 5 when the reel shaft is in the memorized tensionless position. Upon rotation of the gear wheel 5, the idler gear 9, which meshes with the internal gear 5a of the wheel 5, rotates at idle without orbiting with the shaft 8c of the locked gear carrier 8 as the axis. This releases the engagement between the protrusion 9a of the idler gear 9 and the protrusion 14b of the hook 14, so that the tip end of the hook 14 is drawn inwardly by the biasing force of the hook spring 15. As a result, the gear wheel 5 co-rotates with the shaft 3 without interference between the internal protrusion 8d of the gear holder 8 and the hook 14.

When the same length of belt as was extracted is rewound onto the reel, the protrusion 9a of the idler gear 9 and the protrusion 14b of the hook 14 again engage each other, and the hook 14 is pushed out where it will engage the protrusion of the gear carrier 8, whereby the gear wheel 5 and the shaft 3 are stopped and the tension load of the belt becomes zero.

The number of the teeth on the internal gear wheel 5 and the number of teeth on the idler gear 9 are established such that the gear wheel 5 can make several revolutions without bringing the protrusions 9a of the idler gear and 14b of the hook into engagement, lest a new memory position be established with the belt slack. For example, 45 teeth on the gear wheel and 11 teeth on the idler gear allows for eleven revolutions of the gear wheel and reel shaft in the belt-unwinding direction from the memorized position.

The belt retractor of the present invention is of very simple construction and compact in size. Most of the parts can be made of synthetic resins, and noise of the gearing is reduced. The mechanism is reliable in use and can be made and assembled at a low cost.

I claim:

1. A seat belt retractor with an automatically memorized tensionless position and having a frame rotatably carrying a belt reel by means of a reel shaft, a spiral winding spring connected between a cover and the reel shaft and biasing the reel in rotation in the belt-winding direction, characterized in that there is a mechanism for keeping the belt reel from rotating in the winding direction at the urging of the winding spring when the reel is at an automatically memorized rotational position, said mechanism comprising a gear wheel affixed to the reel shaft for rotation therewith and having internal teeth within a recess, a hook rotatably carried by the gear wheel adjacent the perimeter thereof and biased toward the reel shaft by a spring, a clutch ring frictionally coupled to the gear wheel by a clutch spring for rotation with the gear wheel and having an abutment, a gear carrier received by the gear wheel for rotation relative thereto about the axis of the reel shaft and having external teeth, an idler gear rotatably carried by the gear carrier and meshing with the internal gear teeth on the gear wheel and having a protrusion engageable with the hook when the idler gear is in a memorized position relative to the hook, which in turn depends upon the relative rotational positions of the gear wheel and gear carrier, the hook being engageable with an abutment on the gear carrier to stop rotation of the gear wheel, relative to the gear wheel, in the belt-winding direction upon engagement of the idler gear protrusion with the hook protrusion, a memory spring connected between the gear carrier and the reel shaft to urge the gear carrier in rotation in the belt-winding direction about the reel shaft axis, a lever pivotably carried by the frame and having a toothed part engageable with the teeth on the gear carrier, actuating means for selectively urging the lever to pivot in a direction to engage the toothed part with the gear carrier teeth, and a friction plate pivotably mounted on a pin on the lever and selectively engaging the reel shaft and holding the lever toothed part out of engagement with the gear carrier teeth until a small rotation of the reel shaft in the belt-unwinding direction disengages the plate from the reel shaft.

* * * * *